US012676820B2

(12) United States Patent
Barton et al.

(10) Patent No.: US 12,676,820 B2
(45) Date of Patent: Jul. 7, 2026

(54) DETECTION AND MANAGEMENT OF L4S CAPABILITIES IN A NETWORK

(71) Applicant: Cisco Technology, Inc., San Jose, CA (US)

(72) Inventors: Robert Edgar Barton, Richmond (CA); Jerome Henry, Pittsboro, NC (US)

(73) Assignee: Cisco Technology, Inc., San Jose, CA (US)

( * ) Notice: Subject to any disclaimer, the term of this patent is extended or adjusted under 35 U.S.C. 154(b) by 147 days.

(21) Appl. No.: 18/799,301

(22) Filed: Aug. 9, 2024

(65) Prior Publication Data

US 2026/0046253 A1     Feb. 12, 2026

(51) Int. Cl.
*H04L 47/125* (2022.01)

(52) U.S. Cl.
CPC ................................. *H04L 47/125* (2013.01)

(58) Field of Classification Search
None
See application file for complete search history.

(56) References Cited

U.S. PATENT DOCUMENTS

| | | | |
|---|---|---|---|
| 11,356,380 B1 | 6/2022 | White et al. | |
| 11,750,487 B1 | 9/2023 | Matthews et al. | |
| 11,863,465 B1 | 1/2024 | Nijim et al. | |
| 2024/0056401 A1* | 2/2024 | Nádas | H04L 47/36 |
| 2025/0240250 A1* | 7/2025 | Taft | H04W 28/0236 |
| 2025/0267098 A1* | 8/2025 | Yu | H04W 28/0289 |
| 2025/0317793 A1* | 10/2025 | Namvar | H04W 28/0284 |
| 2026/0005973 A1* | 1/2026 | Haddad | H04L 47/31 |

FOREIGN PATENT DOCUMENTS

WO     WO2024013545 A1     1/2024

* cited by examiner

*Primary Examiner* — Joshua Joo
(74) *Attorney, Agent, or Firm* — Lee & Hayes, P.C.

(57) ABSTRACT

The techniques described herein identify the use of L4S within a network and enable a network controller to dynamically and proactively manage L4S capable devices and non-L4S capable devices. A traffic analyzer may identify client-endpoint pairs and/or the use of a congestion marker and notify the network controller. The network controller may identify pathways between pairs, capabilities of the network devices in the pathway. The network controller may monitor queues of the L4S capable devices, identify congestion points, and proactively adjust the structure of the queues of one or more of the network devices and/or perform traffic engineering to prevent and/or reduce congestion in the network.

20 Claims, 8 Drawing Sheets

| PROCESSOR(S) 202 | NETWORK INTERFACE(S) 204 |

MEMORY 206

| NETWORK SERVICE FUNCTIONS 208 | NETWORK ORCHESTRATION FUNCTIONS 210 |

| SERVICE MANAGEMENT FUNCTIONS 212 | APPLICATION PROGRAMMING INTERFACES (APIs) 214 |

| PATHWAY COMPONENT 106 | MONITORING COMPONENT 108 |

TRAFFIC COMPONENT 216

DATA STORE 218

| COMMUNICATION LIBRARIES 220 | NETWORK TOPOLOGY 222 | POLICIES 224 | DATA 226 |

NETWORK CONTROLLER 104

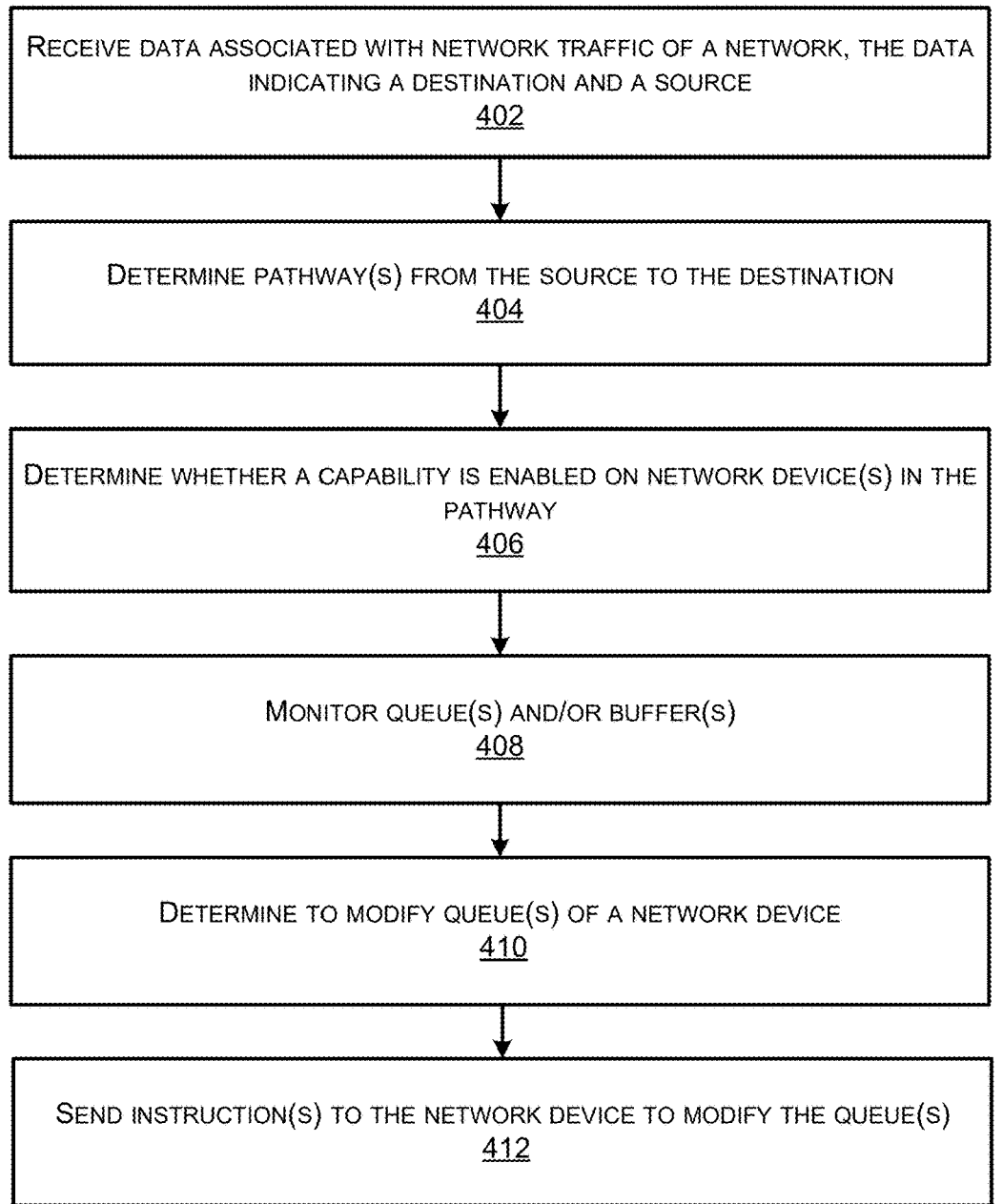

RECEIVE DATA ASSOCIATED WITH NETWORK TRAFFIC OF A NETWORK, THE DATA INDICATING A DESTINATION AND A SOURCE
402

DETERMINE PATHWAY(S) FROM THE SOURCE TO THE DESTINATION
404

DETERMINE WHETHER A CAPABILITY IS ENABLED ON NETWORK DEVICE(S) IN THE PATHWAY
406

MONITOR QUEUE(S) AND/OR BUFFER(S)
408

DETERMINE TO MODIFY QUEUE(S) OF A NETWORK DEVICE
410

SEND INSTRUCTION(S) TO THE NETWORK DEVICE TO MODIFY THE QUEUE(S)
412

MONITOR NETWORK DEVICE(S) IN A NETWORK
502

RECEIVE AN INDICATION THAT CONGESTION IS OCCURRING WITHIN THE NETWORK
504

DETERMINE A NETWORK DEVICE WITHIN THE NETWORK AT WHICH THE
CONGESTION IS OCCURRING
506

DETERMINE ALTERNATIVE PATHWAY(S) THAT EXCLUDE THE NETWORK DEVICE
508

SEND INSTRUCTION(S) TO THE NETWORK DEVICE(S) TO RE-ROUTE TRAFFIC VIA
THE ALTERNATIVE PATHWAY(S)
510

DETECTION AND MANAGEMENT OF L4S CAPABILITIES IN A NETWORK

TECHNICAL FIELD

The present disclosure relates generally to the field of computer networking, and more particularly to detecting and managing L4S capabilities within a network.

BACKGROUND

Low Latency, Low Loss, Scalable Throughout (L4S) is an emerging standard to deal with congestion in networks. In particular, L4S is an architecture and protocol suite defined by the IETF with the purpose to provide low queuing latency, low packet loss, and scalable throughput control for real-time applications (e.g., streaming video, multiplayer games, and other real-time applications). For instance, L4S splits a buffer into a L4S queue, which is generally reserved for real-time application traffic, latency sensitive traffic, and non-queue building application traffic, etc., and a classic queue, which can handle all other traffic. L4S can enable a node a pathway within a network to signal potential congestion. That is, L4S is generally handled independently by network node(s) and endpoint(s).

In order for L4S to work end-to-end, network node(s) may need to know that a client device and endpoint are L4S capable and L4S needs to be implemented on the network node(s). However, as L4S is still emerging, scenarios exist where nodes may not support L4S and/or L4S capabilities may not be enabled. Further, handling of L4S communications is difficult, leading to incorrect handling L4S by network node(s), resulting in increased congestion within the network.

Accordingly, there is a need of a way to detect L4S communications within a network and intelligently manage L4S traffic and network node(s).

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIGS. 3A-3C illustrate exemplary communications between components of the system of FIGS. 1 and 2 according to different exemplary embodiments.

FIG. 4 illustrates a flow diagram of an example system for dynamically managing L4S behavior in a network according to the techniques described in FIGS. 1-3C.

DESCRIPTION OF EXAMPLE EMBODIMENTS

Overview

Figure 1:
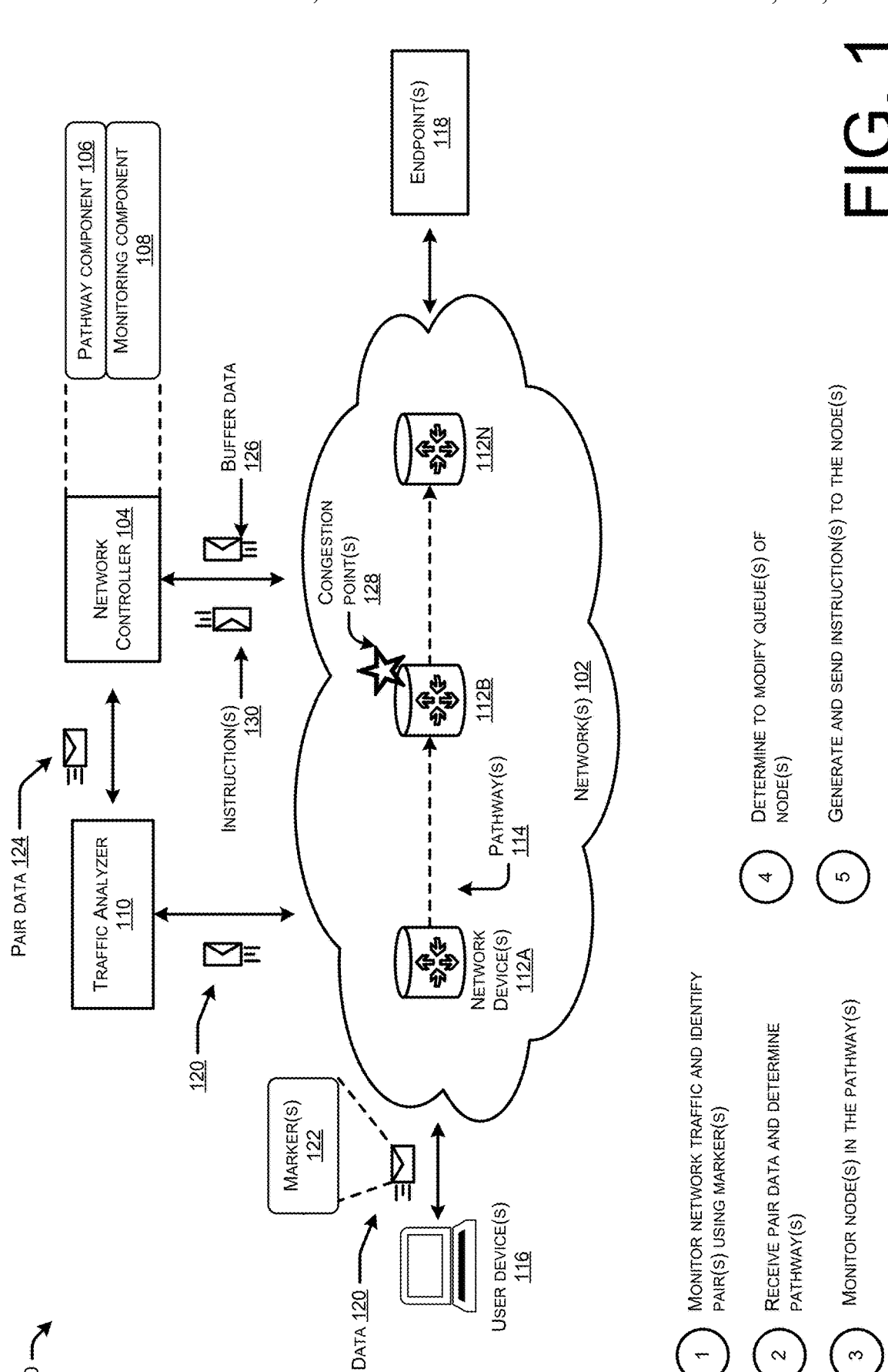
FIG. 1 illustrates a system-architecture diagram of an environment in which a system can discover L4S behavior and intelligently and proactively manage L4S and traffic within the network.

The present disclosure relates generally to the field of computer networking, and more particularly to detecting and managing L4S capabilities within a network.

A method to perform the techniques described herein may be implemented by a network controller. The method may include receiving data associated with network traffic, the data indicating a source and a destination are using a marker associated with a capability. The method may include determining a pathway through the network from the source and to the destination, the pathway comprising first network devices. The method may also include determining, based on the pathway, whether the capability is enabled on each of the first network devices, wherein the capability enables the first network devices to share respective buffers of the first network devices between multiple queues. Additionally, the method may include monitoring the multiple queues of the first network devices. The method may include determining, based on the monitoring, that space within a first queue associated with the marker is reaching a threshold level on a network device of the first network devices. The method may also include sending, to the network device, instructions to adjust a size of the first queue and a second size of a second queue associated with other traffic.

Additionally, any techniques described herein, may be performed by a system and/or device having non-transitory computer-readable media storing computer-executable instructions that, when executed by one or more processors, performs the method(s) described above and/or one or more non-transitory computer-readable media storing computer-readable instructions that, when executed by one or more processors, cause the one or more processors to perform the method(s) described herein.

Example Embodiments

Low Latency, Low Loss, Scalable Throughout (L4S) is an emerging standard to deal with congestion in networks. In particular, L4S is an architecture and protocol suite defined by the IETF with the purpose to provide low queuing latency, low packet loss, and scalable throughput control for real-time applications (e.g., streaming video, multiplayer games, and other real-time applications). For instance, L4S splits a buffer into a L4S queue, which is generally reserved for real-time application traffic, latency sensitive traffic, and non-queue building application traffic, etc., and a classic queue, which can handle all other traffic. L4S can enable a node a pathway within a network to signal potential congestion. That is, L4S is generally handled independently by network node(s) and endpoint(s). For instance, L4S implementation enables a node to perform 2 functions: (1) sending L4S traffic to the L4S queue to avoid head-of-line congestion issues in the main queue, and (2) mark congestion in incoming L4S packets when the L4S queue has more than a (configurable) count of waiting packets.

In order for L4S to work end-to-end, network node(s) may need to know that a client device and endpoint are L4S capable and L4S needs to be implemented on the network node(s). For example, a client device and an endpoint (e.g., a server, an application, etc.) may communicate via a network and indicate that they are capable of performing L4S. In this example, within the network, congestion may occur that impacts the performance between the client device and the endpoint. With L4S, a node that is L4S enabled can print a marker into a packet header of the traffic being sent from the client device to the endpoint. The marker may act as a congestion notification. When the packet is received by the endpoint, the endpoint may recognize that congestion is occurring due to the marker. The endpoint may then send a message to the client device to slow down and/or stop sending traffic at such a high rate. In response, the client device may slow down traffic.

L4S is designed to warn an endpoint that congestion was experienced somewhere in the network, and that the endpoint should send a message to the sender (e.g., the client device) to slow its bit rate to reduce the probability of packet loss and increased latency or jitter. However, a network must have L4S or L4S support (e.g., keeping ECN fields) implemented on each node. An L4S capable client device and endpoint (e.g., application, etc.) may be communicating and expressing their ability to support L4S. However, if a network node in the pathway between the client device and the endpoint experiences congestion and does not support L4S, then problems may occur. For instance, as L4S is still emerging, scenarios exist where nodes may not support L4S and/or L4S capabilities may not be enabled. That is, congestion may be occurring at nodes that either (1) cannot implement L4S or (2) do not have L4S enabled. Thus, the nodes may not add the marker to the traffic to notify the endpoint.

Moreover, existing L4S techniques are reactive. That is, under L4S, L4S enabled nodes only react once congestion is already occurring. Thus, existing techniques do not prevent congestion from occurring in the first place. Further, queues of L4S devices are managed independently by each network device. Thus, the queues may be static or fixed in size.

Additionally, there is no existing mechanism to centrally identify L4S enabled client devices and endpoints and/or centrally manage L4S traffic, other network traffic, and buffer(s) of network devices.

Accordingly, there is a need of a centralized way to detect L4S communications within a network and intelligently and dynamically manage L4S traffic and network node(s).

This disclosure describes techniques and mechanisms for a system to discover L4S behavior in the network and proactively manage L4S using a network controller. In some examples, the system may receive data associated with network traffic, the data indicating a source and a destination are using a marker associated with a capability. The system may determine a pathway through the network from the source and to the destination, the pathway comprising first network devices. The system may determine, based on the pathway, whether the capability is enabled on each of the first network devices, wherein the capability enables the first network devices to share respective buffers of the first network devices between multiple queues. The system may monitor the multiple queues of the first network devices. The system may determine, based on the monitoring, that space within a first queue associated with the marker is reaching a threshold level on a network device of the first network devices. The system may send, to the network device, instructions to adjust a size of the first queue and a second size of a second queue associated with other traffic.

In some examples, the system may comprise a traffic analyzer. In some examples, the traffic analyzer may correspond to a third-party component, a component of the network, and/or a component of a network controller. For instance, the traffic analyzer may correspond to a flow analyzer, such as Netflow, Stealthwatch, or any other suitable mechanism. In some examples, the traffic analyzer may be configured to receive traffic data being sent between a client device and an endpoint. In some examples, the traffic analyzer is configured to identify, based on the traffic data, pair data associated with L4S. For instance, the traffic analyzer may be configured to identify a client device and an endpoint that are communicating within the network using L4S. In some examples, the traffic analyzer may be configured to collect flow logs and/or network traffic.

For instance, the traffic analyzer may be configured to analyze the traffic data (e.g., network traffic and/or flow logs) and identify the use of an explicit congestion notification (ECN) codepoint or marker in the header(s) of the traffic data. As an example, the marker may comprise "00 Non-ECT" (indicating the client device and/or endpoint is non-ECN capable); "01ECT(1)" (indicating the client device and/or endpoint is L4S-capable); "10 ECT(0)" (indicating a ECN-capable transport); and/or "11 CE" (indicating that congestion is being experienced).

The traffic analyzer may identify the which client device(s) and endpoint(s) pairs are communicating using L4S (e.g., based on identifying the "01ECT(1)" header(s) in the traffic data) and may notify the network controller of the L4S pair(s) (e.g., both the source and the destination). In some examples, the traffic analyzer may identify when the traffic data includes the "11 CE" marker and notify the network controller that congestion is being experienced.

Thus, the current techniques utilize a traffic analyzer to identify client device and endpoint pairs, thereby enabling the controller to identify L4S connections. In contrast, existing controllers do not currently have a mechanism to identify L4S connections, as the controller(s) do not generally analyze packet header(s) of packet flow(s) within the network and/or currently do not have the capability to identify the ECN codepoint markings. Further, existing controllers do not presently have the capability to detect when congestion is occurring for L4S queues within a network. Thus, by utilizing a flow analyzer, the techniques described herein can enable the network controller to know when L4S behavior and/or congestion is detected within the network.

In some examples, the network controller may comprise a pathway component. In some examples, the pathway component may be configured to receive the pair(s) from the traffic analyzer. In some examples, the network controller and the traffic analyzer may communicate using a control channel. The pathway component may be configured to determine a physical pathway through the network from the client device to the endpoint. For instance, the pathway component may determine the physical location(s) (e.g., geographic locations) of the client device and the endpoint. The pathway component may determine, based on the physical location(s), the physical pathway (e.g., which network device(s) packets are traversing) through the network connection (e.g., overlay connection, tunnel, etc.) between each client device and endpoint identified.

In some examples, the pathway component may be configured to determine whether the network device(s) in the pathway are L4S enabled devices. The pathway component may identify network device(s) within the pathway that are L4S enabled, but do not have L4S functionality turned on. In this example, the pathway component may send instructions to the network device to cause the L4S functionality to turn on. By turning L4S on in L4S enabled network devices, the L4S enabled network devices may utilize adaptive queue management (AQM), which may create two queues that run in parallel: (1) an L4S queue (e.g., for L4S traffic) and (2) a legacy queue (e.g., for all other traffic). Thus, the buffer of each L4S enabled device may be shared between the two queues.

In some examples, the network controller may comprise a monitoring component. In some examples, the monitoring component may be configured to collect performance data of flows between each client device and endpoint pair. For instance, the monitoring component may collect the performance data by examining packet loss, jitter, and latency through each network device on the pathway. In some examples, the performance data may be stored in association with each respect pair in memory of the network controller and/or the network.

In some examples, the monitoring component is configured to receive buffer data from each network device in the pathway and monitor the queuing structure of each node. For instance, the monitoring component may be configured to modify and/or manage queue ratios of each L4S enabled network device. For instance, the monitoring component may have access to buffer data from each network device (L4S enabled and/or non-L4S enabled) in the pathway. The monitoring component may determine that packet(s) within an L4S queue of one of the L4S enabled devices is starting to pile up and/or reach a threshold. The monitoring component may send instructions to the L4S enabled network device to increase the size of the L4S queue and decrease the size of the legacy queue in order to rebalance the buffer allocation and optimize packet flow at the L4S enabled network device. In some examples, instructions to rebalance the queues may be sent in real-time. In some examples, the instructions may be based on queue size, queue depth, etc.

In some examples, the monitoring component may be configured to determine that congestion is starting to occur on a non-L4S enabled network device. In this example, the monitoring component may determine (e.g., identify or find) a closest network device in the pathway that is L4S enabled. The monitoring component may send instructions to the closest L4S enabled network device to cause the L4S-enabled network device to mark L4S packets with the congestion marker (e.g., "11 CE"). Thus, the first L4S enabled network device prior to or after the non-L4S enabled network device may act as a L4S marking proxy, thereby proactively causing a reduction in traffic flow.

In some examples, the monitoring component may be configured to receive a congestion notification from the traffic analyzer. The monitoring component may be configured to identify which network device(s) the congestion is occurring at within the pathway. The monitoring component may be configured to evaluate the queue level(s) and/or L4S capabilities of the network device(s) within the pathway, as well as other network device(s) within the network. In some examples, such as where the monitoring component determines that adjusting the queue level(s) of the L4S-enabled network devices will no longer impact or reduce the congestion as needed; or (2) where the monitoring component has adjusted the queue level(s) and congestion has continued, the monitoring component may determine alternative pathway(s) between the client device and the endpoint. The alternative pathways may be based on network device capabilities, where the congestion is occurring, or other factors. The monitoring component may perform traffic engineering and may send instructions to the network device(s) in the network that cause the network devices to split and re-route the traffic. For instance, the instructions may cause the network devices to split the traffic in half and send a first half via a first alternative route and the second half via a second alternative route, thereby avoiding the congested network device. In some examples, the instructions may cause the network devices to send only L4S traffic via a first alternative route that (1) comprises only L4S-enable network devices and/or (2) avoids the congested network device. In this example, the instructions may cause the network devices to send non-L4S traffic via a second alternative route that may comprise L4S enabled devices and/or non-L4S network devices and/or avoids the congested network device. In some examples, such as in an overlay network, the instructions may move an SDA/EVPN pathway to a less congested network device or underlay network for L4S traffic.

In this way, the system may provide mechanisms to discover L4S behavior and intelligently and proactively manage L4S and traffic within the network. For instance, the system may utilize a flow analyzer, the techniques described herein can enable the network controller to know when L4S behavior and/or congestion is detected within the network. Further, the network controller may send instructions customized to each L4S enabled network device, based on real-time traffic. That is, unlike existing L4S techniques, where all L4S traffic is slowed down when congestion occurs, the current techniques enable the queue size of L4S queues and legacy queues to be adjusted in real-time to optimize packet flow at each network node. Moreover, unlike existing L4S techniques that are reactive, the current techniques may cause rebalancing of queues to occur before packet(s) contain a congestion notification marker. Further, by performing traffic engineering, the current techniques enable the network controller to perform proactive remediation and re-programming of network device(s), thereby reducing the time of congestion. Thus, the techniques improve the handling of L4S in networks by utilizing a centralized network controller to proactively manage all network devices in a pathway, ensure L4S capabilities are turned on, proactively adjust queue(s), thereby reducing and/or preventing congestion from occurring.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an environment in which a system 100 can discover L4S behavior and intelligently and proactively manage L4S and traffic within the network. While the system 100 shows an example network controller 104, it is understood that any of the components of the system may be implemented on any device in the network 102. Moreover, while the system 100 shows the example network controller 104 as being included as part of the network 102, it is understood that the network controller 104 and/or any of the components of the system may be implemented as part of an on-premise solution. For instance, the network controller 104 may be included as part of a software package that is configured to be deployed within an environment of a user, such as a customer.

In some examples, the system 100 may include a network 102 that includes network devices 112. The network 102 may include one or more networks implemented by any viable communication technology, such as wired and/or wireless modalities and/or technologies. The network 102 may include any combination of Personal Area Networks (PANs), SDCI, Local Area Networks (LANs), Campus Area Networks (CANs), Metropolitan Area Networks (MANs), extranets, intranets, the Internet, short-range wireless communication networks (e.g., ZigBee, Bluetooth, etc.), RA VPNs, VPNs, ZTNA, Wide Area Networks (WANs)—both centralized and/or distributed—and/or any combination, permutation, and/or aggregation thereof. The network 102 may include devices, virtual resources, or other nodes that relay packets from one network segment to another by nodes in the computer network. The network 102 may include multiple devices that utilize the network layer (and/or session layer, transport layer, etc.) in the OSI model for packet forwarding, and/or other layers. In some examples, the network 102 comprises a cloud network and/or an enterprise network. In some examples, the network device(s) 112 may comprise router(s), switch(es), server(s), or any other computing device.

The system 100 may further include traffic analyzer 110. In some examples traffic analyzer 110 may be implemented as a component of the network controller 104. In the illustrated example, traffic analyzer 110 may be implemented as a separate component of the network(s) 102. In some examples, the traffic analyzer 110 may correspond to a third-party component, a component of the network, and/or a component of a network controller. For instance, the traffic analyzer 110 may correspond to a flow analyzer, such as Netflow, Stealthwatch, or any other suitable mechanism. In some examples, the traffic analyzer may be configured to receive data 120 being sent between a user device 116 and an endpoint 118. The data may comprise marker(s) 122. Marker(s) 122 may comprise ECN codepoint marker(s).

In some examples, the traffic analyzer 110 is configured to identify, based on the data 120, pair data 124 associated with L4S. For instance, the pair data 124 may comprise the user device 116 and endpoint 118 pair(s) that are communicating within the network using L4S. In some examples, the traffic analyzer 110 may be configured to collect flow logs and/or network traffic. The traffic analyzer 110 may send the pair data to the network controller 104.

The system 100 may comprise a network controller 104. In some examples, the network controller 104 corresponds to a system that has complete visibility into the fabric of a given network (e.g., enterprise network, smaller network, etc.). In some examples, the network controller 104 may comprise a network orchestrator, one or more processors, etc.

As illustrated the network controller 104 may comprise a pathway component 106 and/or a monitoring component 108. As described in greater detail below, the pathway component 106 is configured to identify pathway(s) 114 between a user device 116 and an endpoint 118; determine whether the network device(s) in the pathway are L4S enabled devices; and send instructions to turn L4S capabilities on. In some examples, the pathway component may be configured to determine alternative pathway(s) between the user device(s) 116 and endpoint(s) 118. In some examples, the pathway(s) 114 may indicate that data 120 being sent between the user device 116 and endpoint 118 traverses network device(s) 112A, network device(s) 112B, network device(s) 112N, etc.

As described in greater detail below, the monitoring component 108 is configured to receive buffer data 126, monitor queue(s) (e.g., queue size, queue depth(s), etc.), collect and monitor performance data, identify congestion point(s) 128 (e.g., where congestion is occurring, is starting to occur or reach a threshold, is likely to occur based on performance data, and/or is still occurring after sending instruction(s) 130), adjust queue structure(s) of the network device(s) 112, and/or perform traffic engineering. For instance, the monitoring component may determine based on the buffer data 126, that congestion is starting to occur at network device 112B. In this example, the network controller may send instruction(s) 130 to network device 112B. The instruction(s) 130 may cause the network device 112B to adjust queue size(s) of the L4S queue and legacy queue(s).

In some examples, user device(s) 116 may be configured to communicate with endpoint(s) 118 via the network(s) 102. In some examples, user device(s) 116 may correspond to any computing device capable of accessing network(s) 102. In some examples, user device(s) 116 may comprises a capability to communicate using L4S.

In some examples, endpoint(s) 118 may correspond to a destination being accessed by a user. For instance, endpoint(s) 118 may correspond to a server, a service, a cloud service, the Internet, a website, etc. In some examples, endpoint(s) 118 may correspond to a device (e.g., a server, a network device, or any other computing device or virtual machine) that comprises a capability to communicate using L4S.

In some examples, the endpoint(s) 118 may correspond to site(s). In some examples, the site(s) comprise one or more server(s), enterprise network(s), and/or service(s) associated with a service provider, one or more network device(s), etc. In some examples, the site(s) correspond to one or more data center(s) comprising various network components, such as, for example, network switch(es) (also referred to as node(s)) operating on physical servers. In some examples, the site(s) may comprise physical server(s) that may host one or more virtual machines. Each virtual machine may be configured to execute one of various operations and act as one or more virtual components for the cloud network(s) and/or enterprise/application network. In some examples, the physical server(s) may host any number of virtual machines. In some examples, the physical server(s) in the enterprise/application network may host the various network components of the enterprise/application network.

At "1", the system may monitor network traffic and identify pair(s) using marker(s). For instance, the system may monitor data 120 using traffic analyzer 110. The traffic analyzer 110 may identify source and destination pair(s) that are L4S capable based on the marker(s) 122.

At "2", the system may receive pair data and determine pathway(s). For instance, the network controller 104 may receive pair data 124. The network controller may determine the physical pathway between each pair identified in pair data 124. As noted above, the system may instruct one or more of the node(s) to turn L4S capabilities on.

At "3", the system may monitor node(s) in the pathway(s). For instance, the system may utilize monitoring component 108 to monitor the node(s), queue(s) of the node(s), performance data of the node(s), etc.

At "4", the system may determine to modify queue(s) of node(s). For instance, the system may determine that one or more node(s) have L4S traffic piling up and that loss, latency, jitter, etc. is likely to occur. In some examples, the modification of the queue(s) may occur prior to the node(s) adding the congestion marker to traffic header(s).

At "5", the system may generate and send instruction(s) to the node(s). For instance, the system may send instruction(s) 130. In some examples, the instructions may be sent using monitoring component 108.

In this way, the system may provide mechanisms to discover L4S behavior and intelligently and proactively manage L4S and traffic within the network. For instance, the system may utilize a flow analyzer, the techniques described herein can enable the network controller to know when L4S behavior and/or congestion is detected within the network. Further, the network controller may send instructions customized to each L4S enabled network device, based on real-time traffic. That is, unlike existing L4S techniques, where all L4S traffic is slowed down when congestion occurs, the current techniques enable the queue size of L4S queues and legacy queues to be adjusted in real-time to optimize packet flow at each network node. Moreover, unlike existing L4S techniques that are reactive, the current techniques may cause rebalancing of queues to occur before packet(s) contain a congestion notification marker. Further, by performing traffic engineering, the current techniques enable the network controller to perform proactive remediation and re-programming of network device(s), thereby reducing the time of congestion. Thus, the techniques improve the handling of L4S in networks by utilizing a centralized network controller to proactively manage all network devices in a pathway, ensure L4S capabilities are turned on, proactively adjust queue(s), thereby reducing and/or preventing congestion from occurring.

Figure 2:
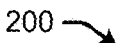
FIG. 2 illustrates a component diagram of an example controller described in FIG. 1.

FIG. 2 illustrates a component diagram 200 of an example controller described in FIG. 1. In some instances, one or more of the components of the network controller 104 may run on one or more computing devices in, or associated with, the network 102 (e.g., a single device or a system of devices). In some instances, the network controller 104 may be integrated as part of an enterprise network.

Generally, the network controller 104 may include a programmable controller that manages some or all of the controller activities of the network 102 and manages or monitors the network state using one or more centralized control models.

As illustrated, the network controller 104 may include, or run on, one or more hardware processors 202 (processors), one or more devices, configured to execute one or more stored instructions. The processor(s) 202 may comprise one or more cores. Further, the network controller 104 may include or be associated with (e.g., communicatively coupled to) one or more network interfaces 204 configured to provide communications with network device(s), the edge device(s), and other devices, and/or other systems or devices in the network 102 and/or remote from the network 102. The network interfaces 204 may include devices configured to couple to personal area networks (PANs), wired and wireless local area networks (LANs), wired and wireless wide area networks (WANs), SDCI's, and so forth. For example, the network interfaces 204 may include devices compatible with any networking protocol.

The network controller 104 may also include memory 206, such as computer-readable media, that stores various executable components (e.g., software-based components, firmware-based components, etc.). The memory 206 may generally store components to implement functionality described herein as being performed by the network controller 104. The memory 206 may store one or more network service functions 208, such as a slicing manager, a topology manager to manage a topology of the network 102, a host tracker to track what network components are hosting which programs or software, a switch manager to manage switches of the network 102, a process manager, and/or any other type of function performed by the network controller 104.

The network controller 104 may further include network orchestration functions 210 stored in memory 206 that perform various network functions, such as resource management, creating and managing network overlays, programmable APIs, provisioning or deploying applications, software, or code to hosts, and/or perform any other orchestration functions. Further, the memory 206 may store one or more service management functions 212 configured to manage the specific services of the network 102 (configurable), and one or more APIs 214 for communicating with devices in the network 102 and causing various controller functions to occur.

In some examples, the network controller 104 may include a traffic component 216. In some examples, the traffic component 216 may correspond to traffic analyzer 110. The traffic component may be configured to be configured to receive traffic data being sent between a client device and an endpoint. In some examples, the traffic component 216 is configured to identify, based on the traffic data, pair data associated with L4S. For instance, the traffic component 216 may be configured to identify a client device and an endpoint that are communicating within the network using L4S. In some examples, the traffic component 216 may be configured to collect flow logs and/or network traffic.

For instance, the traffic component 216 may be configured to analyze the traffic data (e.g., network traffic and/or flow logs) and identify the use of an explicit congestion notification (ECN) codepoint or marker in the header(s) of the traffic data. As an example, the marker may comprise "00 Non-ECT" (indicating the client device and/or endpoint is non-ECN capable); "01ECT(1)" (indicating the client device and/or endpoint is L4S-capable); "10 ECT(0)" (indicating a ECN-capable transport); and/or "11 CE" (indicating that congestion is being experienced).

The traffic component 216 may identify the which client device(s) and endpoint(s) pairs are communicating using L4S (e.g., based on identifying the "01ECT(1)" header(s) in the traffic data) and may notify the network controller of the L4S pair(s) (e.g., both the source and the destination). In some examples, the traffic component 216 may identify when the traffic data includes the "11 CE" marker and notify the network controller that congestion is being experienced.

Thus, the current techniques utilize component 216 to identify client device and endpoint pairs, thereby enabling the controller to identify L4S connections. In contrast, existing controllers do not currently have a mechanism to identify L4S connections, as the controller(s) do not generally analyze packet header(s) of packet flow(s) within the network and/or currently do not have the capability to identify the ECN codepoint markings. Further, existing controllers do not presently have the capability to detect when congestion is occurring for L4S queues within a network. Thus, by utilizing a flow analyzer, the techniques described herein can enable the network controller to know when L4S behavior and/or congestion is detected within the network.

In some examples, the network controller 104 may include a pathway component 106. In some examples, the pathway component may be configured to receive the pair(s) from the traffic component 216. The pathway component 106 may be configured to determine a physical pathway through the network from the client device to the endpoint. For instance, the pathway component may determine the physical location(s) (e.g., geographic locations) of the client device and the endpoint. The pathway component may determine, based on the physical location(s), the physical pathway (e.g., which network device(s) packets are traversing) through the network connection (e.g., overlay connection, tunnel, etc.) between each client device and endpoint identified. In some examples, the pathway component may be configured to determine alternative pathway(s). For instance, the pathway component may be configured to determine alternative pathway(s) that may avoid a particular network device, comprise all or primarily L4S enabled network device(s), comprise all or primarily non-L4S capable network devices, etc.

In some examples, the pathway component 106 may be configured to determine whether the network device(s) in the pathway are L4S enabled devices. The pathway component may identify network device(s) within the pathway that are L4S enabled, but do not have L4S functionality turned on. In this example, the pathway component may send instructions to the network device to cause the L4S functionality to turn on. By turning L4S on in L4S enabled network devices, the L4S enabled network devices may utilize adaptive queue management (AQM), which may create two queues that run in parallel: (1) an L4S queue (e.g., for L4S traffic) and (2) a legacy queue (e.g., for all other traffic). Thus, the buffer of each L4S enabled device may be shared between the two queues.

In some examples, the network controller 104 may include a monitoring component 108. In some examples, the monitoring component 108 may be configured to collect performance data of flows between each client device and endpoint pair. For instance, the monitoring component may collect the performance data by examining packet loss, jitter, and latency through each network device on the pathway. In some examples, the performance data may be stored in association with each respect pair in memory of the network controller and/or the network.

In some examples, the monitoring component 108 is configured to receive buffer data from each network device in the pathway and monitor the queuing structure of each node. For instance, the monitoring component may be configured to modify and/or manage queue ratios of each L4S enabled network device. For instance, the monitoring component may have access to buffer data from each network device (L4S enabled and/or non-L4S enabled) in the pathway. The monitoring component may determine that packet(s) within an L4S queue of one of the L4S enabled devices is starting to pile up and/or reach a threshold. The monitoring component may send instructions to the L4S enabled network device to increase the size of the L4S queue and decrease the size of the legacy queue in order to rebalance the buffer allocation and optimize packet flow at the L4S enabled network device. In some examples, instructions to rebalance the queues may be sent in real-time. In some examples, the instructions may be based on queue size, queue depth, etc.

In some examples, the monitoring component 108 may be configured to determine that congestion is starting to occur on a non-L4S enabled network device. In this example, the monitoring component may determine (e.g., identify or find) a closest network device in the pathway that is L4S enabled. For instance, the monitoring component may use network topology information, capability data, locations of the network devices, and/or any other data described herein. The monitoring component may send instructions to the closest L4S enabled network device to cause the L4S-enabled network device to mark L4S packets with the congestion marker (e.g., "11 CE"). Thus, the first L4S enabled network device prior to or after the non-L4S enabled network device may act as a L4S marking proxy, thereby proactively causing a reduction in traffic flow.

In some examples, the monitoring component 108 may be configured to receive a congestion notification from the traffic analyzer. The monitoring component may be configured to identify which network device(s) the congestion is occurring at within the pathway. The monitoring component may be configured to evaluate the queue level(s) and/or L4S capabilities of the network device(s) within the pathway, as well as other network device(s) within the network. In some examples, such as where the monitoring component determines that adjusting the queue level(s) of the L4S-enabled network devices will no longer impact or reduce the congestion as needed; or (2) where the monitoring component has adjusted the queue level(s) and congestion has continued, the monitoring component may determine alternative pathway(s) between the client device and the endpoint. The alternative pathways may be based on network device capabilities, where the congestion is occurring, or other factors. In some examples, the monitoring component 108 may request the pathway component 106 identify alternative pathway(s) based on the factor(s).

The monitoring component 108 may perform traffic engineering and may send instructions to the network device(s) in the network that cause the network devices to split and re-route the traffic. In some examples, the instructions may be generated based on factors including availability of network devices, capability of network devices, bandwidth, performance (e.g., KPIs), etc. For instance, the instructions may cause the network devices to split the traffic in half and send a first half via a first alternative route and the second half via a second alternative route, thereby avoiding the congested network device. In some examples, the instructions may cause the network devices to split the traffic according to any suitable portions (e.g., 80%/20%; 10%/90%; 30%/70%; 40%/60%; etc.). In some examples, the instructions may cause the network devices to be split into any number of alternative pathways (e.g., 3, 4, or any number of pathways). In some examples, the instructions may cause the network devices to send only L4S traffic via a first alternative route that (1) comprises only L4S-enable network devices and/or (2) avoids the congested network device. In this example, the instructions may cause the network devices to send non-L4S traffic via a second alternative route that may comprise L4S enabled devices and/or non-L4S network devices and/or avoids the congested network device. In some examples, such as in an overlay network, the instructions may move an SDA/EVPN pathway to a less congested network device or underlay network for L4S traffic.

In some examples, the monitoring component 108 and/or pathway component 106 may utilize one or more machine learning techniques to perform any of their respective functions. Machine learning techniques include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. As used herein, the terms "machine learning," "machine-trained," and their equivalents, may refer to a computing model that can be optimized to accurately recreate certain outputs based on certain inputs. In some examples, the machine learning models include deep learning models, such as convolutional neural networks (CNN), deep learning neural networks (DNN), and/or artificial intelligence models. The term "neural network," and its equivalents, may refer to a model with multiple hidden layers, wherein the model receives an input (e.g., a vector) and transforms the input by performing operations via the hidden layers. An individual hidden layer may include multiple "neurons," each of which may be disconnected from other neurons in the layer. An individual neuron within a particular layer may be connected to multiple (e.g., all) of the neurons in the previous layer. A neural network may further include at least one fully connected layer that receives a feature map output by the hidden layers and transforms the feature map into the output of the neural network. In some examples, the neural network comprises a graph where each node of the graph represents a layer within the neural network. Each node may be connected as part of a chain (e.g., a concatenation of layers). In some examples, input may be received by a node within the graph, the input is computed by the node and gets passed to one or more additional nodes in the chain.

The network controller 104 may further include a data store 218, such as long-term storage, that stores communication libraries 220 for the different communication protocols that the network controller 104 is configured to use or perform. Additionally, the data store 218 may include network topology data 222, such as a model representing the layout of the network components in the network 102 and/or data indicating available bandwidth, available CPU, delay between nodes, computing capacity, processor architecture, processor type(s), etc. The data store 218 may store policies 224 that include, but are not limited to, network policy(ies), network controller policy(ies), security data associated with the network, security policies configured for the network, firewall policies, firewall configuration data, network configuration policies, network configuration data, security posture data, and/or compliance policies configured for the network. The data store 218 may store data 226 including metadata, performance data, traffic data, flow logs, instruction data, capability data associated with each network device, location data, telemetry data, or any other data and/or information described herein.

Figure 3A:
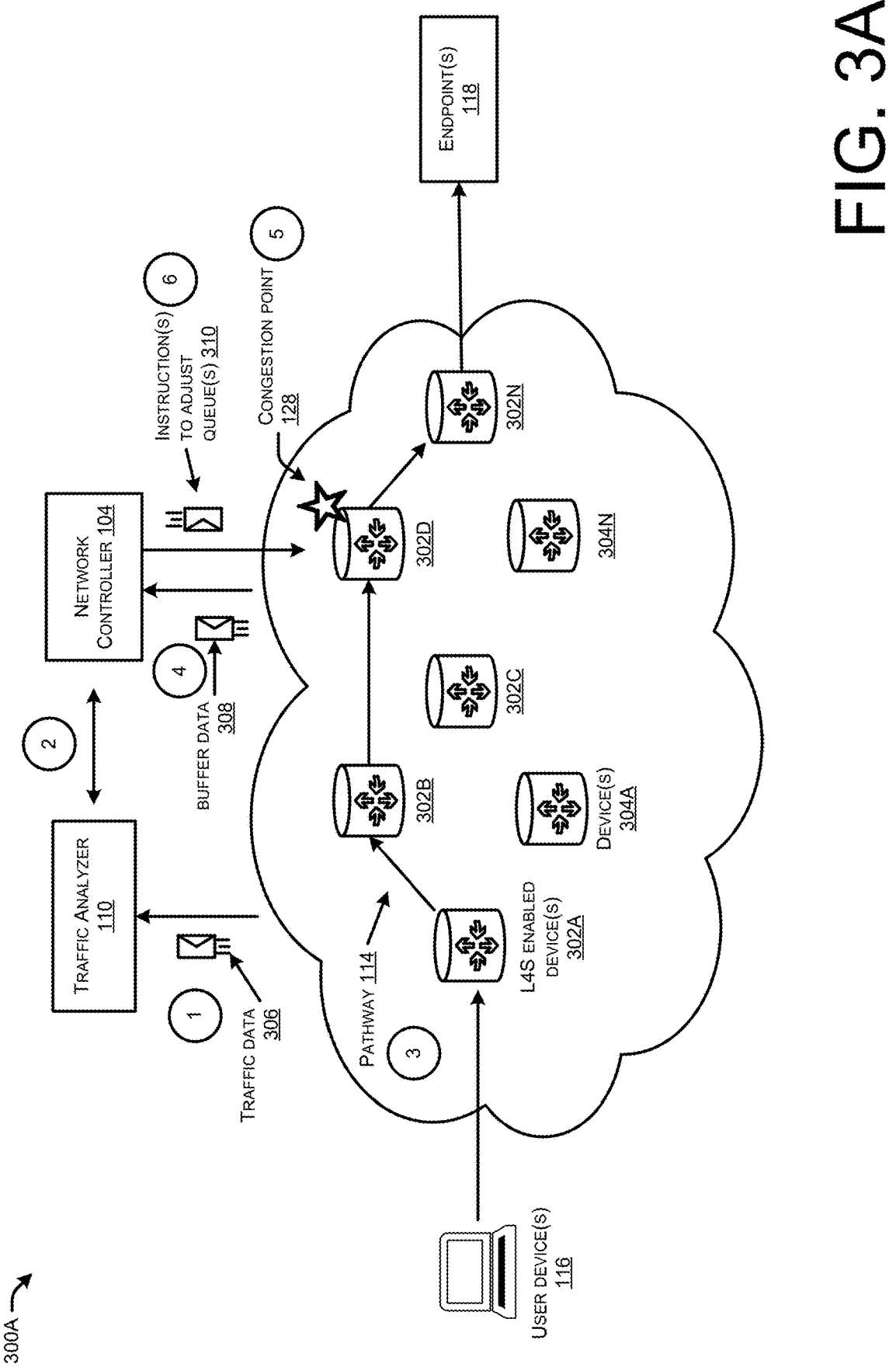
Figure 3B:
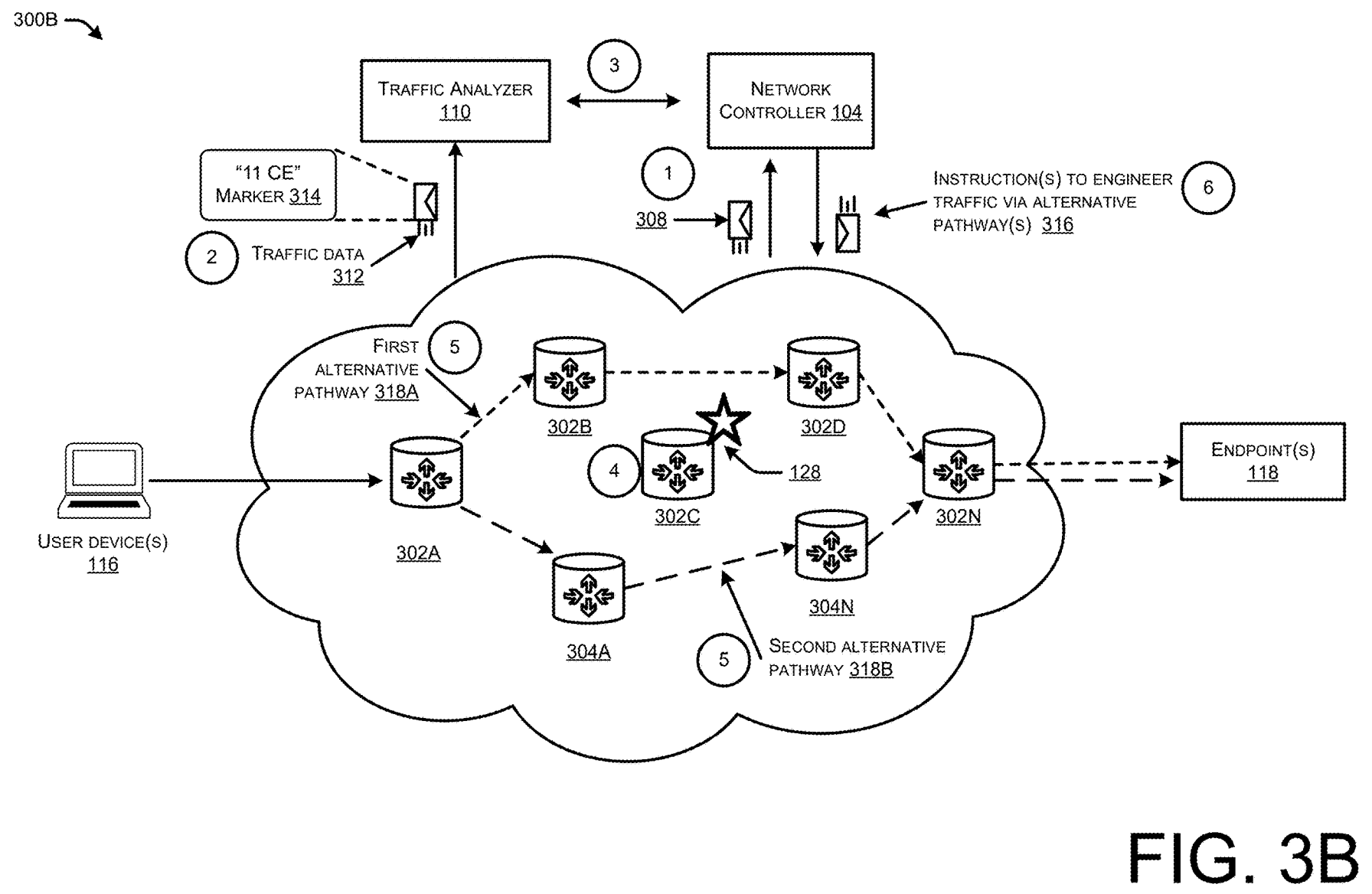
Figure 3C:
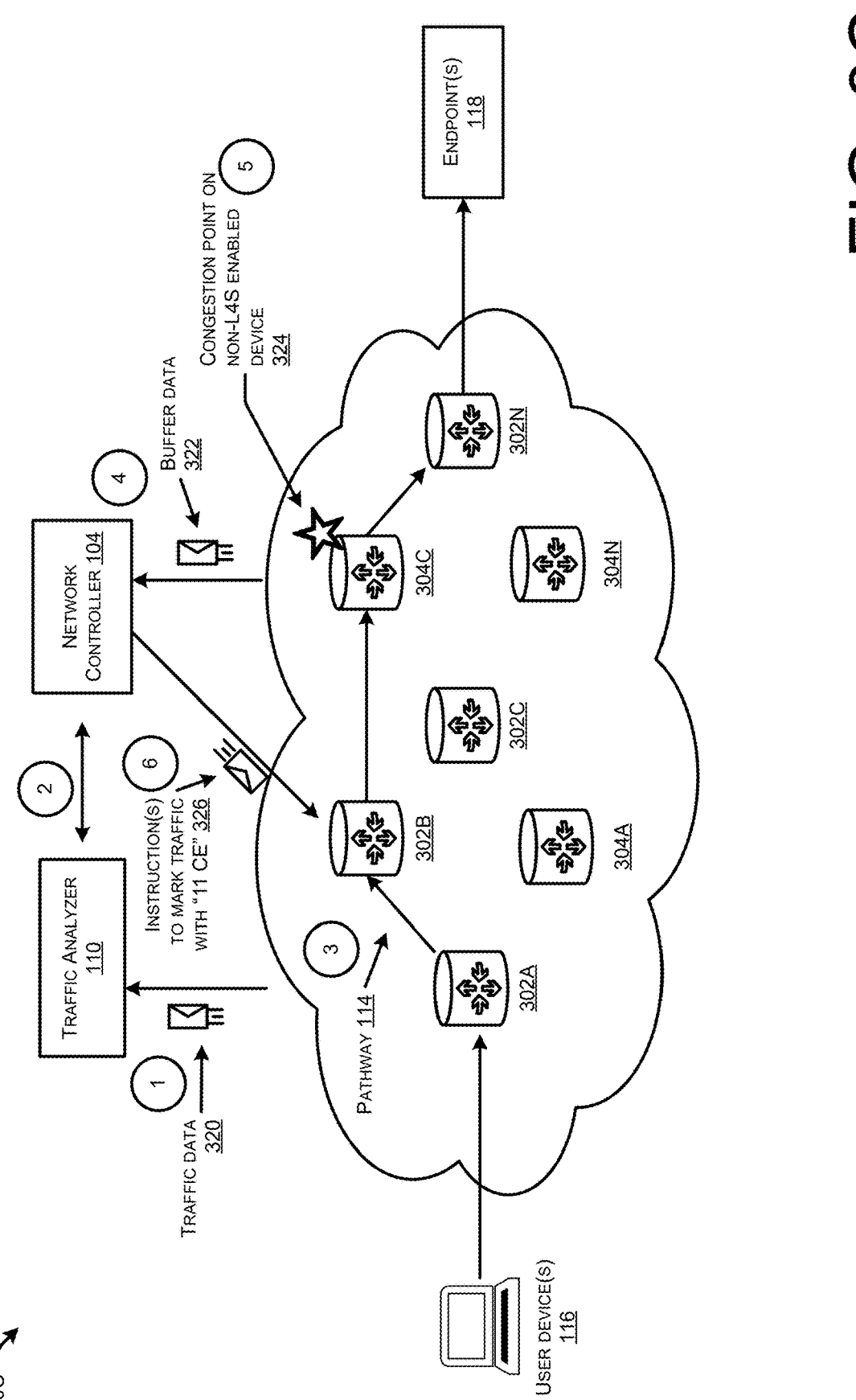

FIGS. 3A-3C illustrate exemplary communications between components of the system of FIGS. 1 and 2 according to different exemplary embodiments 300A, 300B, and 300C. One or more of the components or steps illustrated in FIG. 3A may be performed independently or in conjunction with one or more components or steps shown in FIGS. 3B and 3C. One or more of the components or steps illustrated in FIG. 3B may be performed independently or in conjunction with one or more components or steps shown in FIGS. 3A and 3C. One or more of the components or steps illustrated in FIG. 3C may be performed independently or in conjunction with one or more components or steps shown in FIGS. 3A and 3B. The illustrated steps or functions performed in FIGS. 3A-3C are examples and not limited to the steps or functions shown. The embodiments 300A-300C may include additional or fewer steps, component, and/or functions. Moreover, the steps of the embodiments 300A-300C illustrated in FIGS. 3A-3C may be performed in any order.

FIG. 3A illustrates an example of communications between components of the system 100. In some examples, FIG. 3A corresponds to an embodiment 300A where congestion is occurring at an L4S enabled network device.

As illustrated in FIG. 3A, the embodiment 300A includes traffic analyzer 110, network controller 104, user device(s) 116, endpoint(s) 118, a congestion point 128, and a pathway 114. Embodiment 300A further includes L4S enabled device(s) 302A, 302B, 302C, 302D, . . . 302N (referred to collectively as "L4S enabled device(s) 302"). L4S enable device(s) 302 may correspond to network device(s) 112 that are capable of performing L4S and/or have L4S turned on.

Embodiment 300A further includes device(s) 304A, . . . 304N (referred to collectively as "device(s) 304"). Device(s) 304 may correspond to network device(s) 112 that are not capable of performing L4S (e.g., non-L4S capable network devices).

At "1," the traffic analyzer 110 may receive traffic data 306. In this embodiment traffic data may correspond to data 120. Traffic data 306 may comprise flow logs, telemetry data, flow data, etc. In some examples, traffic data 306 may comprise markers 122. As noted above, the markers may correspond to ECN codepoints, including "00 Non-ECT" (non-ECN capable); "01 ECT(1)" (L4S-capable device); "10 ECT(0)" (ECN-capable transport); and/or "11 CE" (Congestion Experienced). In some examples, the traffic data 306 may comprise source and destination data.

At "2," the traffic analyzer 110 examines the traffic data 306 for the L4S markers. In some examples, the traffic analyzer may identify the use of L4S capable devices, such as by identifying the use of "01 ECT(1)" in a packet header. In some examples, L4S capability may involve both the client and application marking the "01 ECT" codepoint in the ECN field of the packet header. In this example, When an L4S capable pair (source, destination) is detected, the traffic analyzer informs the controller and sends pair data 124. As noted above, the pair data may comprise the source address and destination address of the pair. In some examples, the traffic analyzer 110 uses a control channel to send the pair data 124.

In some examples, the traffic analyzer 110 may identify the use of the L4S congestion marker (e.g., "11 CE") in the ECN field of a packet header. In this example, the traffic analyzer 110 may output a notification to the network controller 104 that congestion is occurring within the network. In some examples, the traffic analyzer 110 operates under the control of the network controller 104.

At "3," the network controller 104 may examine locations of the user device 116 and the endpoint and may determines the network pathway 114 between them. Pathway 114 may correspond to an L4S pathway and/or may comprise L4S enabled device(s) 302A, 302B, 302D, and 302N.

At "4," the network controller 104 may receive buffer data 308. Buffer data 308 may comprise queue data (e.g., queue structure), packet loss data, jitter data, latency data, etc. Buffer data 308 may be received from each network device in pathway 114. For instance, buffer data 308 may be received from L4S enabled devices 302A, 302B, 302D, and 302N. The network controller 104 may determine performance data of flows based on examining the buffer data 308 (e.g., such as examining packet loss, jitter, and latency through each network node on the pathway 114). The network controller 104 may examine the queuing structure of each of L4S enabled devices 302A, 302B, 302D, and 302N along the pathway 114.

At "5," the network controller 104 may identify congestion point 128 at L4S enabled device 302D. In some examples, congestion point 128 may indicate that loss, latency, and/or jitter is starting to occur, is above a threshold level, and/or is likely to occur within a period of time at node 302D. In some examples, the congestion point 128 may be associated with a device where the congestion marker "11 CE" will start being used within a period of time.

At "6," the network controller 104 may send instruction(s) 310 to adjust the queue(s) of node 302D. For instance, the instruction(s) 310 may instruct L4S enabled device 302D to reduce the size of the legacy queue by 20% and reallocate that space to the L4S queue.

Accordingly, unlike existing L4S techniques, where network devices manage congestion themselves (e.g., such as via a centrally managed L4S AQM of the network device), the techniques enable a network controller to utilize network visibility to monitor and dynamically adapt queues of all the L4S enabled network devices in the pathway. Moreover, by proactively managing queue(s) of network devices, the network controller may reduce the use of the congestion marker, as congestion within the network is prevented.

FIG. 3B illustrates an example of communications between components of the system 100. In some examples, FIG. 3B corresponds to an embodiment 300B where the system 100 may perform traffic engineering in response to congestion. In some examples, the steps of embodiment 300B may occur after the steps of embodiment 300A of FIG. 3A and/or the steps of embodiment 300C of FIG. 3 have occurred. In some examples, the steps of embodiment 300B may occur independently of FIGS. 3A and/or 3C.

As illustrated in FIG. 3B, the embodiment 300B includes traffic analyzer 110, network controller 104, user device(s) 116, endpoint(s) 118, a congestion point 128, and a pathway 114. Embodiment 300A further includes L4S enabled device(s) 302A, 302B, 302C, 302D, . . . 302N (referred to collectively as "L4S enabled device(s) 302"). L4S enable device(s) 302 may correspond to network device(s) 112 that are capable of performing L4S and/or have L4S turned on.

Embodiment 300B further includes device(s) 304A, . . . 304N (referred to collectively as "device(s) 304"). Device(s) 304 may correspond to network device(s) 112 that are not capable of performing L4S (e.g., non-L4S capable network devices).

At "1," the network controller 104 receives buffer data 308. As noted above, the network controller 104 may generate performance data based on the buffer data.

At "2," the traffic analyzer may receive traffic data 312. In the illustrated embodiment, the traffic data 312 comprises the "11 CE" marker 314, indicating congestion is occurring somewhere in the network.

At "3," the traffic analyzer 110 notifies the network controller 104 that congestion is occurring. For instance, the traffic analyzer 110 may notify the network controller via a control channel.

At "4," the network controller 104 examines all nodes and their buffers along the pathway 114 to determine the source of the congestion. The network controller 104 may identify node 302C as the congestion point 128. In this example, the congestion point 128 represents a node that is using the "11 CE" marker.

At "5," the network controller 104 may evaluate the congestion (e.g., the queue levels of node(s) in pathway 114, a frequency of the "congestion experienced" messages, etc.). As described in embodiment 300A of FIG. 3A, instead of just letting the user device 116 and endpoint 118 bitrate themselves lower, the network controller 104 may take remedial action by attempting to increase queue sizes at the congestion point 128.

In the illustrated embodiment 300B, the network controller 104 may determine that previous remediation was unsuccessful and/or that performing remediation would not reduce the congestion. In this embodiment 300B, the network controller 104 may determine whether alternative pathway(s) around the congested node could be used (either for L4S, or non-L4S traffic, or both). For instance, the network controller 104 may identify a first alternative pathway 318A and/or a second alternative pathway 318B. In some examples, the network controller 104 may identify the alternative pathways using monitoring component 108 and/or pathway component 106.

At "6," the network controller 104 may send instruction(s) 316 to engineer traffic via the alternative pathway(s). For instance, the instruction(s) may re-program the nodes to perform re-routing of a first portion of the traffic via the first alternative pathway 318A and a second portion of the traffic via the second alternative pathway 318B. In some examples, such as in an overlay network, this may involve moving an SDA/EVPN path to a less congested node or an underlay for L4S traffic.

Accordingly, the network controller 104 may dynamically re-route traffic via various alternative pathways in order to prevent congestion from occurring with the network.

FIG. 3C illustrates an example of communications between components of the system 100. In some examples, FIG. 3C corresponds to an embodiment 300C where congestion is occurring at a non-L4S capable network device.

As illustrated in FIG. 3C, the embodiment 300C includes traffic analyzer 110, network controller 104, user device(s) 116, endpoint(s) 118, a congestion point 128, and a pathway 114. Embodiment 300C further includes L4S enabled device(s) 302A, 302B, 302C, 302D, . . . 302N (referred to collectively as "L4S enabled device(s) 302"). L4S enable device(s) 302 may correspond to network device(s) 112 that are capable of performing L4S and/or have L4S turned on.

Embodiment 300C further includes device(s) 304A, . . . 304N (referred to collectively as "device(s) 304"). Device(s) 304 may correspond to network device(s) 112 that are not capable of performing L4S (e.g., non-L4S capable network devices).

At "1," the traffic analyzer 110 may receive traffic data 320. In this embodiment traffic data may correspond to data 120. Traffic data 320 may comprise flow logs, telemetry data, flow data, etc. In some examples, traffic data 320 may comprise markers 122. As noted above, the markers may correspond to ECN codepoints, including "00 Non-ECT" (non-ECN capable); "01 ECT(1)" (L4S-capable device); "10 ECT(0)" (ECN-capable transport); and/or "11 CE" (Congestion Experienced). In some examples, the traffic data 320 may comprise source and destination data.

At "2," the traffic analyzer 110 examines the traffic data 320 for the L4S markers. In some examples, the traffic analyzer may identify the use of L4S capable devices, such as by identifying the use of "01 ECT(1)" in a packet header. In some examples, L4S capability may involve both the client and application marking the "01 ECT" codepoint in the ECN field of the packet header. In this example, When an L4S capable pair (source, destination) is detected, the traffic analyzer informs the controller and sends pair data 124. As noted above, the pair data may comprise the source address and destination address of the pair. In some examples, the traffic analyzer 110 uses a control channel to send the pair data 124.

In some examples, the traffic analyzer 110 may identify the use of the L4S congestion marker (e.g., "11 CE") in the ECN field of a packet header. In this example, the traffic analyzer 110 may output a notification to the network controller 104 that congestion is occurring within the network. In some examples, the traffic analyzer 110 operates under the control of the network controller 104.

At "3," the network controller 104 may examine locations of the user device 116 and the endpoint and may determines the network pathway 114 between them. Pathway 114 may comprise L4S enabled device(s) 302A, 302B, and 302N, as well as device 304C. In the illustrated embodiment 300C, device 304C may correspond to a non-L4S enabled device (e.g., a device not capable of performing L4S).

At "4," the network controller 104 may receive buffer data 322. Buffer data 322 may comprise queue data (e.g., queue structure), packet loss data, jitter data, latency data, etc. Buffer data 322 may be received from each network device in pathway 114. For instance, buffer data 322 may be received from devices 302A, 302B, 304C, and 302N. The network controller 104 may determine performance data of flows based on examining the buffer data 322 (e.g., such as examining packet loss, jitter, and latency through each network node on the pathway 114). The network controller 104 may examine the queuing structure of each of L4S enabled devices 302A, 302B, and 302N along the pathway 114.

At "5," the network controller 104 may identify congestion point 324 (e.g., congestion point 128) at device 304C. The network controller 104 may determine that device 304C is a non-L4S enabled device. In some examples, congestion point 324 may indicate that loss, latency, and/or jitter is starting to occur, is above a threshold level, and/or is likely to occur within a period of time at node 304C. In some examples, the congestion point 324 may be associated with a device where the congestion marker "11 CE" will start being used within a period of time.

In some examples, the network controller 104 may identify the closest L4S enabled device in the pathway 114. For instance, the network controller 104 may identify L4S enabled device(s) 302B and/or 302N.

At "6," the network controller 104 may send instruction(s) 326 to mark traffic with a congestion marker to one or more of L4S enabled device(s) 302B and/or 302N. Thus, the network controller 104 may utilize the L4S enabled device(s) as a proxy for device 304C in order to mark traffic with the congestion notification and cause the user device 116 to lower its bitrate.

Accordingly, the network controller 104 may proactively cause the reduction in the rate of traffic flow, thereby remediating congestion and compensating for the non-L4S enabled node within the pathway 114.

FIG. 4 illustrates a flow diagram of an example system 400 for dynamically managing L4S behavior in a network according to the techniques described in FIGS. 1-3C. In some instances, one or more of the steps of system 400 may be performed by one or more devices (e.g., network controller 104, etc.) that include one or more processors and one or more non-transitory computer-readable media storing computer-executable instructions that, when executed by the one or more processors, cause the one or more processors to perform operations of system 400.

At 402, the system may receive data associated with network traffic of a network, the data indicating a destination and a source. For instance, the system may receive pair data from a traffic analyzer associated with the network, such as traffic analyzer 110.

At 404, the system may determine pathway(s) from the source to the destination. For instance, the system may determine a physical pathway through the network, such as pathway 114.

At 406, the system may determine whether a capability is enabled on network device(s) in the pathway. For instance, the capability may correspond to L4S.

In some examples, the system may determine that a second network device of the first network devices does not have the capability enabled. In this example, the system may send, to the second network device, second instructions to enable the capability.

In some examples, the system may determine that a second network device of the first network devices does not have the capability enabled. In this example, the system may determine that the second network device does not support the capability and may identify at least a third network device of the first network devices that does support capability. In some examples, the system may receive an indication of network congestion at the second network device. The system may identify, based on the indication, the third network device and may send, to the third network device, second instructions to mark traffic associated with the first queue with a second marker, the second marker indicating congestion to the source or the destination.

At 408, the system may monitor queue(s) and/or buffer(s). For instance, the system may receive buffer data and generate performance data as described in FIGS. 1-3C above.

At 410, the system may determine to modify queue(s) of a network device. For instance, the system may determine to modify the queues based on space within a first queue associated with the marker reaching a threshold level on a network device in the pathway. In some examples, the threshold level may, when reached or surpassed, cause the network device to begin marking traffic with a congestion marker.

At 412, the system may send instruction(s) to the network device to modify the queue(s). For instance, the instruction(s) may be to adjust a size of the first queue and a second size of the second queue. In some examples, the first queue may correspond to the L4S queue and the second queue may correspond to the legacy queue.

In some examples, the system may receive an indication of congestion within the network. The system may determine, based on the indication, a location within the network that the congestion is occurring at, the location corresponding to a second network device of the first network devices. The system may determine, based on the location, one or more alternative pathways between the source and the destination, the one or more alternative pathways excluding the second network device. The system may send, to each network device within the network, second instructions to re-route traffic via at least one of the one or more alternative pathways. In some examples, the location is determined based on analyzing the respective buffers of the first network devices. In some examples, the instructions further cause each network device to re-route a first portion of the traffic associated with the marker via a first alternative pathway of the one or more alternative pathways and re-route a second portion of the traffic via a second alternative pathway of the one or more alternative pathways. In some examples, the first alternative pathway comprises second network devices that support the capability and the second alternative pathway comprises third network devices that do not support the capability.

In this way, the system may utilize a flow analyzer and enable the network controller to know when L4S behavior and/or congestion is detected within the network. Further, the network controller may send instructions customized to each L4S enabled network device, based on real-time traffic. That is, unlike existing L4S techniques, where all L4S traffic is slowed down when congestion occurs, the current techniques enable the queue size of L4S queues and legacy queues to be adjusted in real-time to optimize packet flow at each network node. Moreover, unlike existing L4S techniques that are reactive, the current techniques may cause rebalancing of queues to occur before packet(s) contain a congestion notification marker. Thus, the techniques improve the handling of L4S in networks by utilizing a centralized network controller to proactively manage all network devices in a pathway, ensure L4S capabilities are turned on, proactively adjust queue(s), thereby reducing and/or preventing congestion from occurring.

Figure 5:
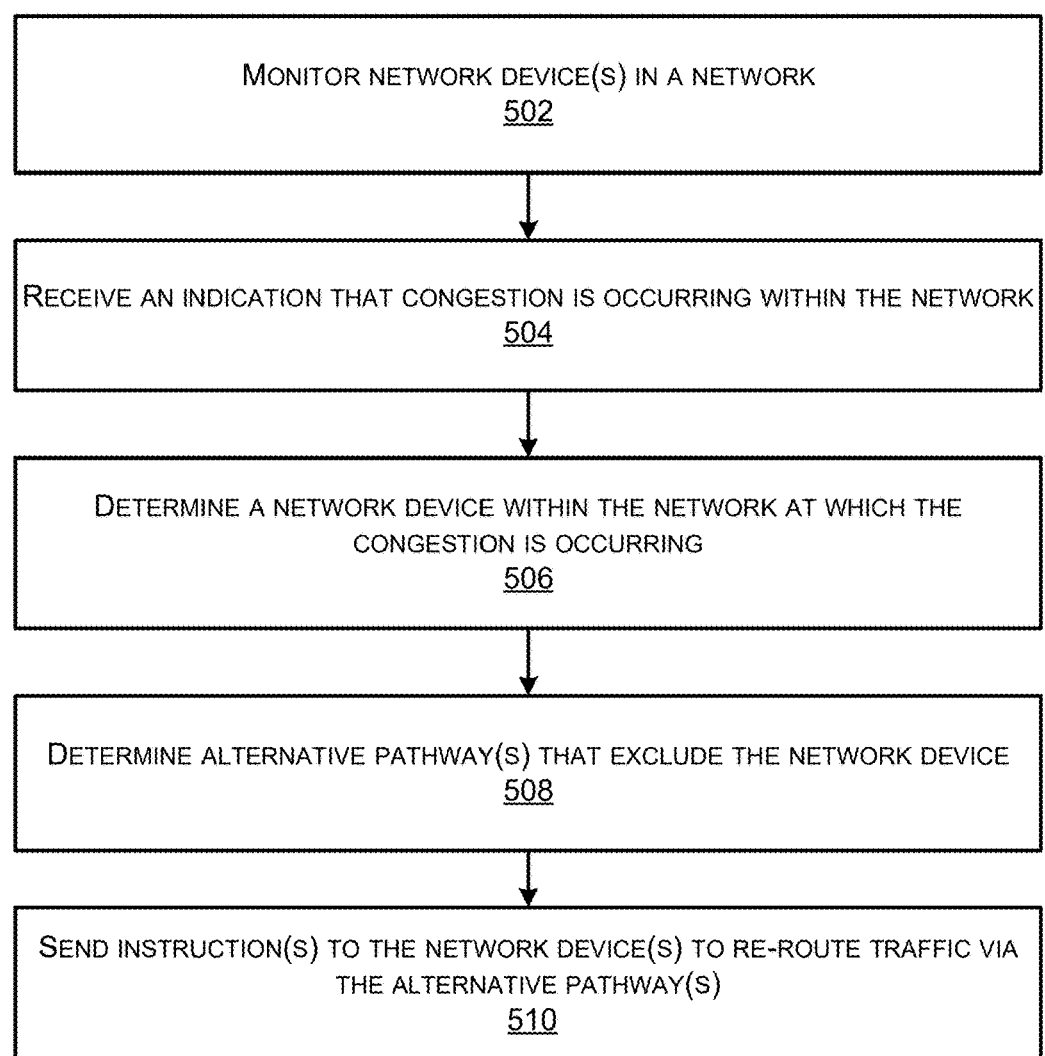
FIG. 5 illustrates a flow diagram of an example system for dynamically managing L4S behavior in a network according to the techniques described in FIGS. 1-4.

FIG. 5 illustrates a flow diagram of an example system 500 for dynamically managing L4S behavior in a network according to the techniques described in FIGS. 1-4. In some instances, one or more of the steps of system 500 may be performed by one or more devices (e.g., network controller 104, etc.) that include one or more processors and one or more non-transitory computer-readable media storing computer-executable instructions that, when executed by the one or more processors, cause the one or more processors to perform operations of system 500.

At 502, the system may monitor network device(s) in a network. For instance, the system may monitor the network device(s) using monitoring component 108.

At 504, the system may receive an indication that congestion is occurring within the network. In some examples, the system may receive the indication from a traffic analyzer. For instance, the traffic analyzer may send the indication in response to detecting the use of a congestion marker (e.g., "11 CE") in a ECN codepoint of packet headers.

At 506, the system may determine a network device within the network at which the congestion is occurring. For instance, the system may determine the network device based on buffer data and/or performance data.

At 508, the system may determine alternative pathway(s) that exclude the network device. For instance, the system may determine alternative pathway(s) using pathway component 106 and/or monitoring component 108. As described above, the alternative pathway(s) may be determined based on various factors, such as a pathway with only or primarily L4S enabled network device(s), non-L4S enabled network devices, and/or locations of the network devices.

At 510, the system may send instruction(s) to the network device(s) to re-route traffic via the alternative pathway(s). As described above, the instruction(s) may reprogram the network device(s) in the network to re-route the traffic using the alternative pathway(s). For instance, the instruction(s) may cause the network device(s) to split the traffic in half, peel off a particular type of traffic, etc.

In this way, the system may provide mechanisms to discover L4S behavior and intelligently and proactively manage L4S and traffic within the network. For instance, by performing traffic engineering, the current techniques enable the network controller to perform proactive remediation and re-programming of network device(s), thereby reducing the time of congestion. Thus, the techniques improve the handling of L4S in networks by utilizing a centralized network controller to proactively manage all network devices in a pathway, ensure L4S capabilities are turned on, proactively adjust queue(s), thereby reducing and/or preventing congestion from occurring.

Figure 6:
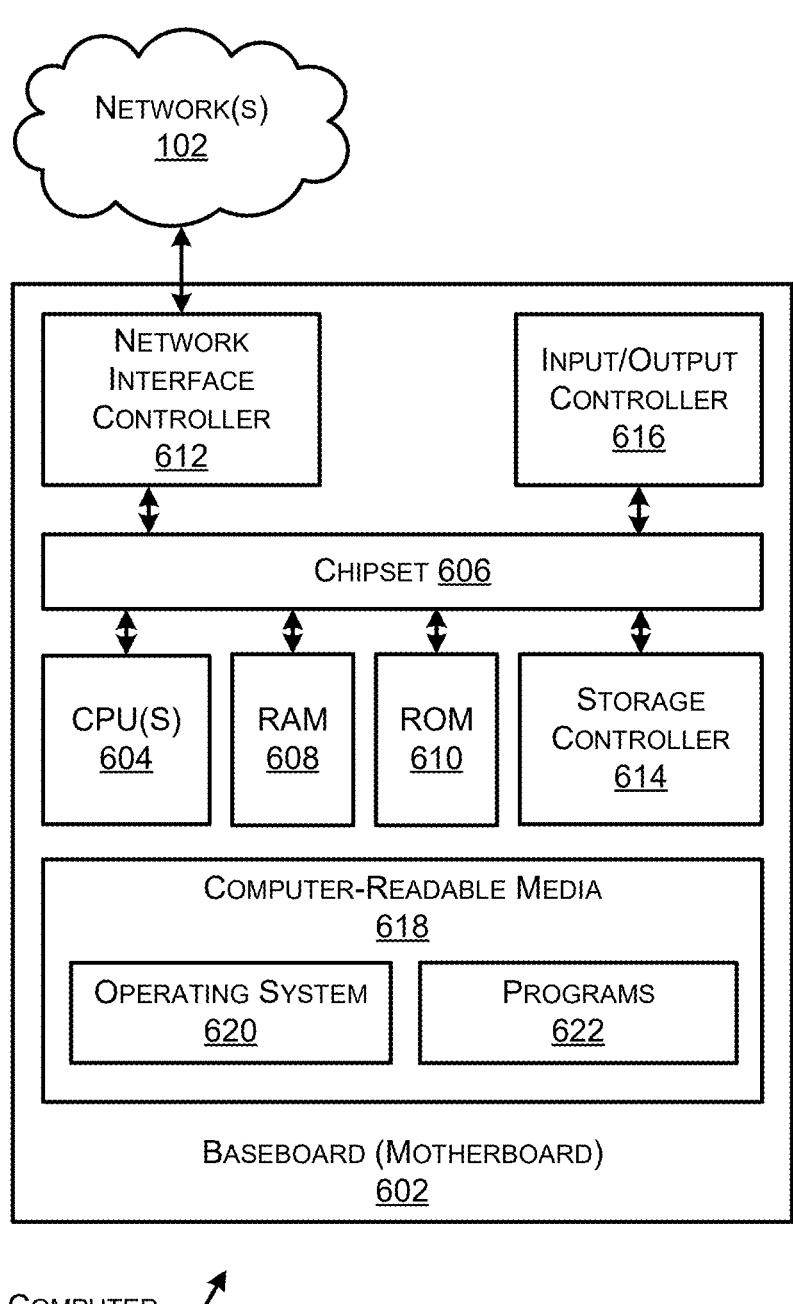
FIG. 6 is a computer architecture diagram showing an illustrative computer hardware architecture for implementing a device that can be utilized to implement aspects of the various technologies presented herein.

FIG. 6 shows an example computer architecture for a device capable of executing program components for implementing the functionality described above. The computer architecture shown in FIG. 6 illustrates any type of computer 600, such as a conventional server computer, workstation, desktop computer, laptop, tablet, network appliance, e-reader, smartphone, or other computing device, and can be utilized to execute any of the software components presented herein. The computer may, in some examples, correspond to a network controller 104 and/or any other device described herein, and may comprise personal devices (e.g., smartphones, tables, wearable devices, laptop devices, etc.) networked devices such as servers, switches, routers, hubs, bridges, gateways, modems, repeaters, access points, and/or any other type of computing device that may be running any type of software and/or virtualization technology.

The computer 600 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computer 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the computer 600. The chipset 606 can further provide an interface to a computer-readable storage medium such as a read-only memory ("ROM") 610 or non-volatile RAM ("NVRAM") for storing basic routines that help to start up the computer 600 and to transfer information between the various components and devices. The ROM 610 or NVRAM can also store other software components necessary for the operation of the computer 600 in accordance with the configurations described herein.

The computer 600 can operate in a networked environment using logical connections to remote computing devices and computer systems through a network, such as network 102. The chipset 606 can include functionality for providing network connectivity through a NIC 612, such as a gigabit Ethernet adapter. The NIC 612 is capable of connecting the computer 600 to other computing devices over the network 102. It should be appreciated that multiple NICs 612 can be present in the computer 600, connecting the computer to other types of networks and remote computer systems.

The computer 600 can be connected to a storage device 618 that provides non-volatile storage for the computer. The storage device 618 can store an operating system 620, programs 622, and data, which have been described in greater detail herein. The storage device 618 can be connected to the computer 600 through a storage controller 614 connected to the chipset 606. The storage device 618 can consist of one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 600 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 618 is characterized as primary or secondary storage, and the like.

For example, the computer 600 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 600 can further read information from the storage device 618 by detecting the physical states or characteristics of one or more particular locations within the physical storage units.

In addition to the mass storage device 618 described above, the computer 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 600. In some examples, the operations performed by the network controller 104 and/or any components included therein, may be supported by one or more devices similar to computer 600. Stated otherwise, some or all of the operations performed by the network controller 104 and/or any components included therein, may be performed by one or more computer devices.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 620 utilized to control the operation of the computer 600. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 618 can store other system or application programs and data utilized by the computer 600.

In one embodiment, the storage device 618 or other computer-readable storage media is encoded with computer-executable instructions which, when loaded into the computer 600, transform the computer from a general-purpose computing system into a special-purpose computer capable of implementing the embodiments described herein. These computer-executable instructions transform the computer 600 by specifying how the CPUs 604 transition between states, as described above. According to one embodiment, the computer 600 has access to computer-readable storage media storing computer-executable instructions which, when executed by the computer 600, perform the various processes described above with regard to FIGS. 1-5. The computer 600 can also include computer-readable storage media having instructions stored thereupon for performing any of the other computer-implemented operations described herein.

The computer 600 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat panel display, a digital projector, a printer, or other type of output device. It will be appreciated that the computer 600 might not include all of the components shown in FIG. 6, can include other components that are not explicitly shown in FIG. 6, or might utilize an architecture completely different than that shown in FIG. 6.

As described herein, the computer 600 may comprise one or more of a network controller 104 and/or any other device. The computer 600 may include one or more hardware processors (processors) configured to execute one or more stored instructions. The processor(s) may comprise one or more cores. Further, the computer 600 may include one or more network interfaces configured to provide communications between the computer 600 and other devices, such as the communications described herein as being performed by the network controller 104 and/or any other device. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 622 may comprise any type of programs or processes to perform the techniques described in this disclosure. For instance, the programs 622 may cause the computer 600 to perform techniques including receiving data associated with network traffic, the data indicating a source and a destination are using a marker associated with a capability; determining a pathway through the network from the source and to the destination, the pathway comprising first network devices; determining, based on the pathway, whether the capability is enabled on each of the first network devices, wherein the capability enables the first network devices to share respective buffers of the first network devices between multiple queues; monitoring the multiple queues of the first network devices; determining, based on the monitoring, that space within a first queue associated with the marker is reaching a threshold level on a network device of the first network devices; and sending, to the network device, instructions to adjust a size of the first queue and a second size of a second queue associated with other traffic.

In this way, the computer 600 can provide mechanisms to discover L4S behavior and intelligently and proactively manage L4S and traffic within the network. For instance, the computer 600 may utilize a flow analyzer, the techniques described herein can enable the network controller to know when L4S behavior and/or congestion is detected within the network. Further, the network controller may send instructions customized to each L4S enabled network device, based on real-time traffic. That is, unlike existing L4S techniques, where all L4S traffic is slowed down when congestion occurs, the current techniques enable the queue size of L4S queues and legacy queues to be adjusted in real-time to optimize packet flow at each network node. Moreover, unlike existing L4S techniques that are reactive, the current techniques may cause rebalancing of queues to occur before packet(s) contain a congestion notification marker. Further, by performing traffic engineering, the current techniques enable the network controller to perform proactive remediation and re-programming of network device(s), thereby reducing the time of congestion. Thus, the techniques improve the handling of L4S in networks by utilizing a centralized network controller to proactively manage all network devices in a pathway, ensure L4S capabilities are turned on, proactively adjust queue(s), thereby reducing and/or preventing congestion from occurring.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method implemented by a network controller of a network, the method comprising:
receiving data associated with network traffic, the data indicating a source and a destination are using a marker associated with a capability;
determining a pathway through the network from the source and to the destination, the pathway comprising first network devices;
determining, based on the pathway, whether the capability is enabled on each of the first network devices, wherein the capability enables the first network devices to share respective buffers of the first network devices between multiple queues;
monitoring the multiple queues of the first network devices;
determining, based on the monitoring, that space within a first queue associated with the marker is reaching a threshold level on a network device of the first network devices; and
sending, to the network device, instructions to adjust a size of the first queue and a second size of a second queue associated with other traffic.

2. The method of claim 1, wherein the network controller determines that a second network device of the first network devices does not have the capability enabled, further comprising:
sending, to the second network device, second instructions to enable the capability.

3. The method of claim 1, wherein the network controller determines that a second network device of the first network devices does not have the capability enabled, further comprising:
determining that the second network device does not support the capability; and

identifying at least a third network device of the first network devices that does support capability.

4. The method of claim 3, further comprising:
receiving an indication of network congestion at the second network device;
identifying, based on the indication, the third network device; and
sending, to the third network device, second instructions to mark traffic associated with the first queue with a second marker, the second marker indicating congestion to the source or the destination.

5. The method of claim 1, wherein the capability corresponds to L4S.

6. The method of claim 1, wherein the data is received from a traffic analyzer associated with the network.

7. The method of claim 1, further comprising:
receiving an indication of congestion within the network;
determining, based on the indication, a location within the network that the congestion is occurring at, the location corresponding to a second network device of the first network devices;
determining, based on the location, one or more alternative pathways between the source and the destination, the one or more alternative pathways excluding the second network device; and
sending, to each network device within the network, second instructions to re-route traffic via at least one of the one or more alternative pathways.

8. The method of claim 7, wherein the location is determined based on analyzing the respective buffers of the first network devices.

9. The method of claim 7, wherein the instructions further cause each network device to re-route a first portion of the traffic associated with the marker via a first alternative pathway of the one or more alternative pathways and re-route a second portion of the traffic via a second alternative pathway of the one or more alternative pathways.

10. The method of claim 9, wherein the first alternative pathway comprises second network devices that support the capability and the second alternative pathway comprises third network devices that do not support the capability.

11. A system comprising:
one or more processors; and
one or more computer-readable media storing instructions that, when executed by the one or more processors, cause the one or more processors to perform operations comprising:
receiving, by a network controller, data associated with network traffic of a network, the data indicating a source and a destination are using a marker associated with a capability;
determining, by the network controller, a pathway through the network from the source and to the destination, the pathway comprising first network devices;
determining, by the network controller and based on the pathway, whether the capability is enabled on each of the first network devices, wherein the capability enables the first network devices to share respective buffers of the first network devices between multiple queues;
monitoring, by the network controller, the multiple queues of the first network devices;
determining, by the network controller and based on the monitoring, that space within a first queue associated with the marker is reaching a threshold level on a network device of the first network devices; and sending, by the network controller and to the network device, instructions to adjust a size of the first queue and a second size of a second queue associated with other traffic.

12. The system of claim 11, wherein the network controller determines that a second network device of the first network devices does not have the capability enabled, the operations further comprising:

sending, to the second network device, second instructions to enable the capability.

13. The system of claim 11, wherein the network controller determines that a second network device of the first network devices does not have the capability enabled, the operations further comprising:

determining that the second network device does not support the capability; and identifying at least a third network device of the first network devices that does support capability.

14. The system of claim 13, the operations further comprising:

receiving an indication of network congestion at the second network device;

identifying, based on the indication, the third network device; and sending, to the third network device, second instructions to mark traffic associated with the first queue with a second marker, the second marker indicating congestion to the source or the destination.

15. The system of claim 11, wherein the capability corresponds to L4S.

16. The system of claim 11, wherein the data is received from a traffic analyzer associated with the network.

17. The system of claim 11, the operations further comprising:

receiving an indication of congestion within the network;

determining, based on the indication, a location within the network that the congestion is occurring at, the location corresponding to a second network device of the first network devices;

determining, based on the location, one or more alternative pathways between the source and the destination, the one or more alternative pathways excluding the second network device; and sending, to each network device within the network, second instructions to re-route traffic via at least one of the one or more alternative pathways.

18. The system of claim 17, wherein the location is determined based on analyzing the respective buffers of the first network devices.

19. The system of claim 17, wherein the instructions further cause each network device to re-route a first portion of the traffic associated with the marker via a first alternative pathway of the one or more alternative pathways and re-route a second portion of the traffic via a second alternative pathway of the one or more alternative pathways.

20. One or more non-transitory computer-readable media maintaining instructions that, when executed by one or more processors of a network controller of a network, program the one or more processors to perform operations comprising:

receiving data associated with network traffic, the data indicating a source and a destination are using a marker associated with a capability;

determining a pathway through the network from the source and to the destination, the pathway comprising first network devices;

determining, based on the pathway, whether the capability is enabled on each of the first network devices, wherein the capability enables the first network devices to share respective buffers of the first network devices between multiple queues;

monitoring the multiple queues of the first network devices;

determining, based on the monitoring, that space within a first queue associated with the marker is reaching a threshold level on a network device of the first network devices; and sending, to the network device, instructions to adjust a size of the first queue and a second size of a second queue associated with other traffic.

* * * * *